US008250094B2

(12) United States Patent
Skaria et al.

(10) Patent No.: US 8,250,094 B2
(45) Date of Patent: Aug. 21, 2012

(54) RELATIONAL LOCKDOWN FOR AN ITEM STORE

(75) Inventors: Simon Skaria, Sammamish, WA (US); Jason T. Hunter, Redmond, WA (US); Kedarnath A. Dubhashi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 219 days.

(21) Appl. No.: 11/490,410

(22) Filed: Jul. 19, 2006

(65) Prior Publication Data
US 2008/0021901 A1 Jan. 24, 2008

(51) Int. Cl.
*G06F 17/30* (2006.01)

(52) U.S. Cl. ........ 707/783; 707/784; 707/785; 707/822; 705/51; 705/59

(58) Field of Classification Search .................. 707/10, 707/100, 102, 200, 8, 694, 704, 757, 781, 707/783, 784, 785
See application file for complete search history.

(56) References Cited

U.S. PATENT DOCUMENTS

| 5,410,693 | A | 4/1995 | Yu et al. ........................ 395/600 |
| 6,236,996 | B1 | 5/2001 | Bapat et al. ...................... 707/9 |
| 6,289,462 | B1* | 9/2001 | McNabb et al. ................. 726/21 |
| 6,405,202 | B1 | 6/2002 | Britton et al. ..................... 707/9 |
| 6,446,069 | B1* | 9/2002 | Yaung et al. ................. 707/785 |
| 6,696,898 | B1 | 2/2004 | Ward et al. ............. 331/116 FE |
| 7,017,183 | B1 | 3/2006 | Frey et al. ........................ 726/5 |
| 2003/0028495 | A1* | 2/2003 | Pallante ............................ 705/78 |
| 2003/0037239 | A1* | 2/2003 | Leung et al. .................. 713/169 |
| 2003/0041110 | A1* | 2/2003 | Wenocur et al. ............. 709/206 |
| 2003/0079136 | A1* | 4/2003 | Ericta et al. ................... 713/185 |
| 2004/0260952 | A1 | 12/2004 | Newman et al. .............. 713/201 |
| 2005/0044089 | A1 | 2/2005 | Wu et al. ....................... 707/100 |
| 2005/0050054 | A1* | 3/2005 | Clark et al. .................... 707/100 |
| 2005/0198348 | A1* | 9/2005 | Yeates et al. ................... 709/232 |
| 2005/0203903 | A1* | 9/2005 | Rajan et al. ......................... 707/8 |
| 2005/0223047 | A1 | 10/2005 | Shah et al. ..................... 707/201 |
| 2005/0232253 | A1* | 10/2005 | Ying et al. ..................... 370/356 |
| 2005/0268117 | A1 | 12/2005 | Simon ............................ 713/193 |
| 2005/0278785 | A1* | 12/2005 | Lieberman ...................... 726/24 |
| 2006/0015741 | A1* | 1/2006 | Carroll .......................... 713/182 |
| 2006/0041555 | A1 | 2/2006 | Blessin et al. ..................... 707/9 |
| 2006/0232663 | A1* | 10/2006 | Gandhi et al. ............. 348/14.02 |

OTHER PUBLICATIONS

Rector, Introducing Longhorn for Developers—Chapter 4: Storage, Jan. 2004, MSDN, pp. 1-10.*
Fernandez, E.B., et al., "A model for evaluation and administration of security in object-oriented databases," *IEEE Transactions on Knowledge and Data Engineering*, 1994, 6(2), 275-292.
Grimes, R., "Revolutionary file storage system lets users search and manage files based on content," *MSDN Magazine, The Microsoft Journal for Developers*, 2006, http://msdn.microsoft.com/msdnmag/issues/04/01/WinFS/, downloaded from the Internet on or about Apr. 19, 2006, 9 pages.
Kisworo, M.W., et al., "Implementation of an object-oriented front-end to a relational database system," *IEEE Region 10 Conference on Computer & Communication Systems*, 1990, 811-815.

(Continued)

*Primary Examiner* — Christyann Pulliam
*Assistant Examiner* — Rezwanul Mahmood
(74) *Attorney, Agent, or Firm* — Woodcock Washburn LLP

(57) ABSTRACT

Various mechanisms are provided for the lockdown of an item store. For example, a method is provided that comprises of disabling access to a relational engine for a set of users associated with a filing system utilizing the relational engine to manipulate data in an item store. Following such disabling of access, an exception is created by allowing access to the relational engine for users of the filing system based on a set of privileges the users have been assigned. The disabling of access can be accomplished by removing system users from ownership roles, and the allowing of access can be accomplished by providing certificates to users that have associated set of privileges granted to the users.

29 Claims, 10 Drawing Sheets

OTHER PUBLICATIONS

Majetic, I., et al., "Authorization and revocation in object-oriented databases," *IEEE Transactions on Knowledge & Data Engineering*, 1997, 9(4), 668-672.

Thomas, R.K., et al., "A trusted subject architecture for multilevel secure object-oriented databases," *IEEE Transactions on Knowledge & Data Engineering*, 1996, 8(1), 16-31.

* cited by examiner

RELATIONAL LOCKDOWN FOR AN ITEM STORE

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright® 2004-2006, Microsoft Corp.

FIELD OF TECHNOLOGY

The present subject matter relates to the field of computing, and more particularly, to file and/or storage systems, although such systems correspond to merely an exemplary and non-limiting field of the presently disclosed subject matter.

BACKGROUND

Storage and management systems such as WinFS (Microsoft Windows® Future Storage or Microsoft Windows® File System), for example, allow different kinds of data to be identified by metadata and use this metadata to set up relationships among data, thereby giving a semantic structure to it. These relationships can then be used by a relational database to enable searching and dynamic aggregation of such data, allowing it to be presented in a variety of ways. In one setup, WinFS can include a relational database engine, derived from the Microsoft® SQL Server database platform, to facilitate such manipulation of data.

One problem associated with this setup is data model integrity. WinFS items are persisted as relational objects using a well-defined item data model. Items can be retrieved using T-SQL views and modified using a robust update infrastructure. The update infrastructure enforces security and safeguards the integrity of item data model. Arbitrary SQL access to an item store may result in compromise of the integrity of data model. Thus, it would be advantageous to provide mechanisms to maintain data model integrity.

Another problem associated with this setup is the disclosure of intellectual property. A significant intellectual property of the item store implementation lies in the layout of object persistence and the implementation of the update infrastructure. Arbitrary SQL access to the item store will expose the patterns for object persistence and details of update infrastructure. This exposure may result in loss of advantage with competitors in similar technological spaces. Thus, it would be advantageous to provide mechanisms that prevent the disclosure of intellectual property.

Yet another problem associated with the aforementioned setup is security. A full fledged relational engine increases the security attack surface area in the item store. Security vulnerabilities in the relational engine can be exposed in operating system clients and servers with installations of item store. In addition, awareness of implementation details may lead to leveraged security attacks. Thus, it would be advantageous to provide mechanisms that maintain the security of WinFS data.

In short, mechanisms are needed, whether systems, methods, computer readable media, and so on, that addresses these shortcomings of the prior art.

SUMMARY

In one aspect of the presently disclosed subject matter, mechanisms are provided for the relational lockdown of an item store. For example, a two stage process can be used: (1) disabling access to a relational engine for a set of identities (users) associated with a filing system utilizing the relational engine to manipulate data in an item store, and (2) following such disabling, allowing access to the relational engine for at least one identity of the filing system based on a set of privileges the identity has been assigned.

More specifically, disabling access to the relational engine can comprise of removing all identities from roles that specify ownership of items in the item store. On the other hand, allowing access can comprise of providing access to said relational engine by using security certificates. Such security certificates can sign any commands intended for the relational engine, thus marking these commands. Such markings, in turn, can convey to the relational engine what set of privilege users have, and thus, what data manipulation (on the item store) to allow and which to disallow.

It should be noted that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. The following figures are included.

DETAILED DESCRIPTION

Figure 1:
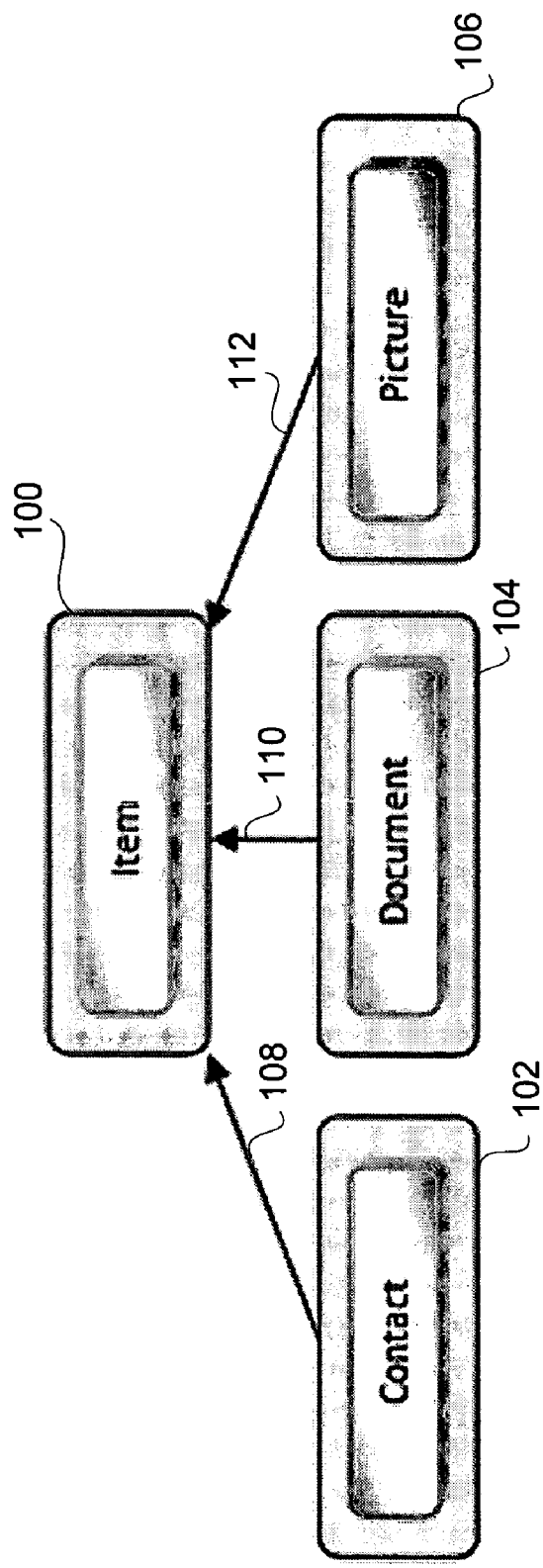
FIG. 1 illustrates a block diagram illustrating an exemplary type hierarchy.

Certain specific details are set forth in this description and accompanying figures to provide a thorough understanding of various aspects of the presently disclosed subject matter. However, certain well-known details often associated with computing and software technology are not set forth in this disclosure in order to avoid unnecessarily obscuring these various aspects. Further, those of ordinary skill in the relevant art will understand that they can practice other aspects of the presently disclosed subject matter without one or more of the details described below. Finally, while various methods are described with reference to steps and sequences in this description, the description as such is for providing a clear implementation of the aforementioned aspects, and the steps and sequences of steps should not be taken as required to practice this subject matter.

Microsoft Windows® File System (WinFS®)

Although the concepts, ideas and features described herein are described in an exemplary fashion with respect to how they are implemented in a file system called Microsoft Windows® Future Storage or Microsoft Windows® File System (WinFS) and the Microsoft Windows Vista® operating system (formerly code-named "Longhorn"), implementations in and applicability to other operating and file systems are contemplated, entirely possible and apparent to those skilled in the art based on the exemplary descriptions provided herein. Provided in this section is an overview of WinFS, drawn largely from sources such as http://www.msdn.com and other derivative sources thereof such as http://en.wikipedia.org/wiki/WinFS, which includes description of the data storage, data model, type system, relationships, rules, access control, data retrieval, search and data sharing aspects of WinFS.

WinFS is a data storage and management system based on relational databases, developed by Microsoft Corp. (headquartered in Redmond, Wash.) for use as an advanced storage subsystem for the Microsoft Windows® operating system. Implemented on top of the NT File System (NTFS), one of the file systems for the Microsoft Windows NT® operating system, WinFS is a centralized data store for the Microsoft Windows® platform.

In WinFS, artificial organization using names and location is done away with, and a more natural organization is created than in hierarchical or desktop search systems—namely, one using rich properties to describe the data in files and the relation of that data with other data. By creating a unified datastore, WinFS promotes sharing and reuse of data between different applications. One advantage of any prior art is that any application, or even the file browser, can understand files created by any application. Addition of rich properties gives further meaning to the data, such as "which persons appear in which pictures," and "the person an e-mail was addressed to." But, instead of viewing the pictures and e-mails and files, WinFS recognizes picture, and e-mail to be specific types of data, which are related to person using the relation "of some person." So, by following the relation, a picture can be used to aggregate e-mails from all the persons in the picture and, conversely, an e-mail can aggregate all pictures in which the addressee appears in. WinFS extends this to understand any arbitrary types of data and the relations that hold them together. The types and relations have to be specified by the application that stores the data, or the user, and WinFS organizes the data accordingly.

WinFS stores data in virtual locations called stores. A WinFS store is a common repository where every application will store their data, along with its metadata, relationships and information on how to interpret the data. In this way, WinFS does away with the folder hierarchy, and allows searching across the entire repository of data.

WinFS store can actually be a relational store, where applications can store their structured as well as unstructured data. Based on the metadata, type of data, and also the relationships of the data with other data as can be specified by the application or the user, WinFS will assign a relational structure to the data. By using the relationships, WinFS can aggregate related data. WinFS provides a unified storage but stops short of defining the format that is to be stored in the data stores. Instead, it supports data to be written in application specific formats. But applications have to provide a schema that defines how the data should be interpreted. For example, a schema could be added to allow WinFS to understand how to read and thus be able to search and analyze, say, a contact. By using the schema, any application can read data from any other application, and also allows different applications to write in each other's format by sharing the schema.

Multiple WinFS stores can be created on a single machine. This allows different classes of data to be kept segregated. For example, official documents and personal documents can be kept in different stores. WinFS, by default, provides only one store, named "DefaultStore." WinFS stores are exposed as shell objects, akin to virtual folders, which dynamically generates a list of all items present in the store and presents them in a folder view. The shell object also allows for the searching of information in the datastore.

WinFS does not have to be a physical file system. Rather, it can provide rich data modeling capabilities on top of the NTFS file system. It can use NTFS to store its data in physical files. WinFS can also use a relational engine, which may be derived from Microsoft® SQL Server 2005, for example, in order to provide a data relations mechanism, since the relation system in WinFS is similar to the relation system used in relational databases. WinFS stores can be SQL Server database (.MDF) files with a FILESTREAM attribute set. These files can be stored in a secured folder named "System Volume Information" placed into the volume root, and in folders under the folder "WinFS" with names of GUIDs of these stores.

WinFS also can allow programmatic access to its features, for example, via a set of Microsoft® NET (.NET) application programming interfaces (APIs), that enables applications to define custom made data types, define relationships among data, store and retrieve information, allow advanced searches, and so on. The applications can then use novel ways of aggregating data and presenting the aggregated data to the user.

WinFS Data Storage

A data unit that is stored in a WinFS store is called a WinFS item. A WinFS item also contains information on how the data item is related with other data. A WinFS Item can further consist of sub-entities called Fragments. WinFS allows Items and Fragments to be related together in different ways. The different types of relationships are:

Containment: Containment is an owning relationship. In an owning relationship there is a parent entity and an child entity Item References: ItemReference is a Fragment type that defines a relationship that contains data between two item instances based on the items keys (ItemId). The ItemReference is directed—one item is the source of the ItemReference and the other item is the target.

Condition based association: Condition based association enable declaration of relationships between items that are based on a value of a condition. The condition is an expression that uses values of the properties of the related items types WinFS helps in unification of data and thus it reduces redundancies. If different applications store data in a non interoperable way, data has to be duplicated across applications which deal with same data. For example, if more than one e-mail application is used, the list of contacts must be duplicated across the two. So, when there is any need for updating contact information, it must be done at two places.

If, by mistake, it is not updated in one of the applications, it will continue to have outdated information. But with WinFS, an application can store all the contact information in a WinFS store, and supply the schema in which it is stored. Then, other applications can use the stored data. By doing so, duplicate data is removed, and with it the hassles of manually synchronizing all instances of the data are obviated.

WinFS Data Model

WinFS models data using the data items, along with its relationships, fragments and rules governing its usage. WinFS needs to understand the type and structure of the data items, so that the information stored in the data item can be made available to any application that requests it. This is done by the use of schemas. For every type of data item that is to be stored in WinFS, a corresponding schema needs to be provided which will define the type, structure and associations of the data. These schemas are defined, for example, using Extensible Markup Language (XML). XML allows designers to create their own customized tags, enabling the definition, transmission, validation, and interpretation of data between applications and between organizations.

Predefined WinFS schemas include schemas for messages, contacts, calendars, file items, etc., and also includes system schemas that include configuration, programs, and other system-related data. Custom schemas can be defined on a per-application basis, in situations where an application wants to store its data in WinFS, but not share the structure of that data with other applications. Or, they can be made available across the system.

WinFS Type System

One key difference between WinFS and other file systems is that WinFS knows the type of each data item that it stores (where the type specifies the properties of the data item). The WinFS type system can be closely associated with the .NET Framework's concept of classes and inheritance. A new type can be created by extending and nesting any predefined types.

For example, FIG. 1 shows a block diagram illustrating an exemplary type hierarchy. Shown is item 100 that has three other item types deriving from it: contact 102, document 104, and picture 307. Item 100 can be a type that serves as a base class for other items, namely, contact 102 type, which may contain various contact information (name, address, etc.); document 104 type that may contain various documentation information; and, picture 106 type which may have various digital images. The three aforementioned types 102, 104, and 106 may have a specified relationship 108, 110, 112 to the item type 100 (for instance, some inheritance relationship).

In particular, WinFS provides four predefined base types: Items, Relationships, ScalarTypes, and ComplexTypes (sometimes referred to as "NestedTypes"). An Item is the fundamental data object, which can be stored, and a Relationship is the relation or link between two data items. Generally, since all WinFS items should have a type, the type of item stored defines its properties. The properties of an Item may be a ScalarType, which defines the smallest unit of information a property can have, or a ComplexType, which is a collection of more than one ScalarTypes and/or ComplexTypes. All WinFS types are made available as .NET Common Language Runtime (CLR) classes. CLR is the core runtime engine in the Microsoft®.NET Framework for executing applications.

Any object represented as a data unit, such as contact, picture, document, etc, can be stored in a WinFS store as a specialization of the Item type. By default, WinFS provides Item types for Files, Contacts, Documents, Pictures, Audio, Video, Calendar, and Messages. The File Item can store any generic data, which is stored in file systems as files. The file item may not be specialized/derived from, but a WinFS schema can be provided to extend it using fragments that are added on to particular instances of File items. A file Item can also support being related to other Items. A developer can extend any of the WinFS types (other than File item), or the base type Item, to provide a type for his or her custom data.

Figure 2:
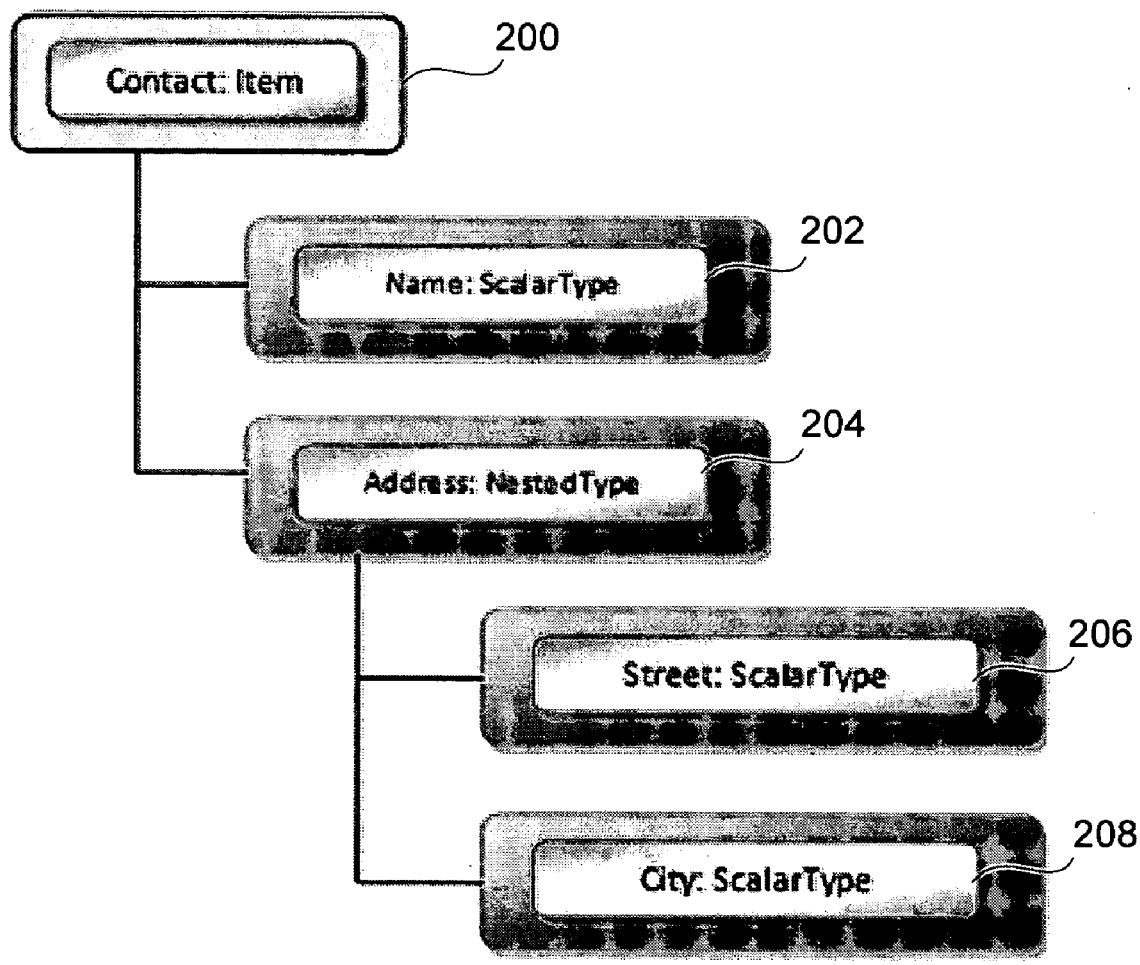
FIG. 2 illustrates a block diagram illustrating an example use of predefined types in defining a new type.

Referring next to FIG. 2, shown is a block diagram illustrating an example use of the predefined types in defining a new type. The data contained in an Item is defined in terms of properties, or fields which hold the actual data. For example, an Item Contact 200 may have a field Name 202 which is a ScalarType, and one field Address 204, a ComplexType (or "NestedType"), which is further composed of two Scalar-Types: Street 206 and City 208. To define this type, the base class Item is extended and the necessary fields are added to the class. A ComplexType field can be defined as another class which contains the two ScalarType fields. Once the type is defined, a schema is defined, which denotes the primitive type of each field. For example, the Name field 202 can be a string, the Address field 204 is a custom defined Address class. And, both of the ScalarTypes 206, 208 can be strings. Furthermore, other primitive types that WinFS supports are Integer, Byte, Decimal, Float, Double, Boolean and DateTime, and so on. The schema will also define which fields are mandatory and which are optional. The Contact Item 401 defined in this way will be used to store information regarding the Contact, by populating the properties field and storing it. If more properties on the item need to be added, such as "last conversed date," this type can be simply extended to accommodate them. Item types for other data can be defined similarly.

Figure 3:
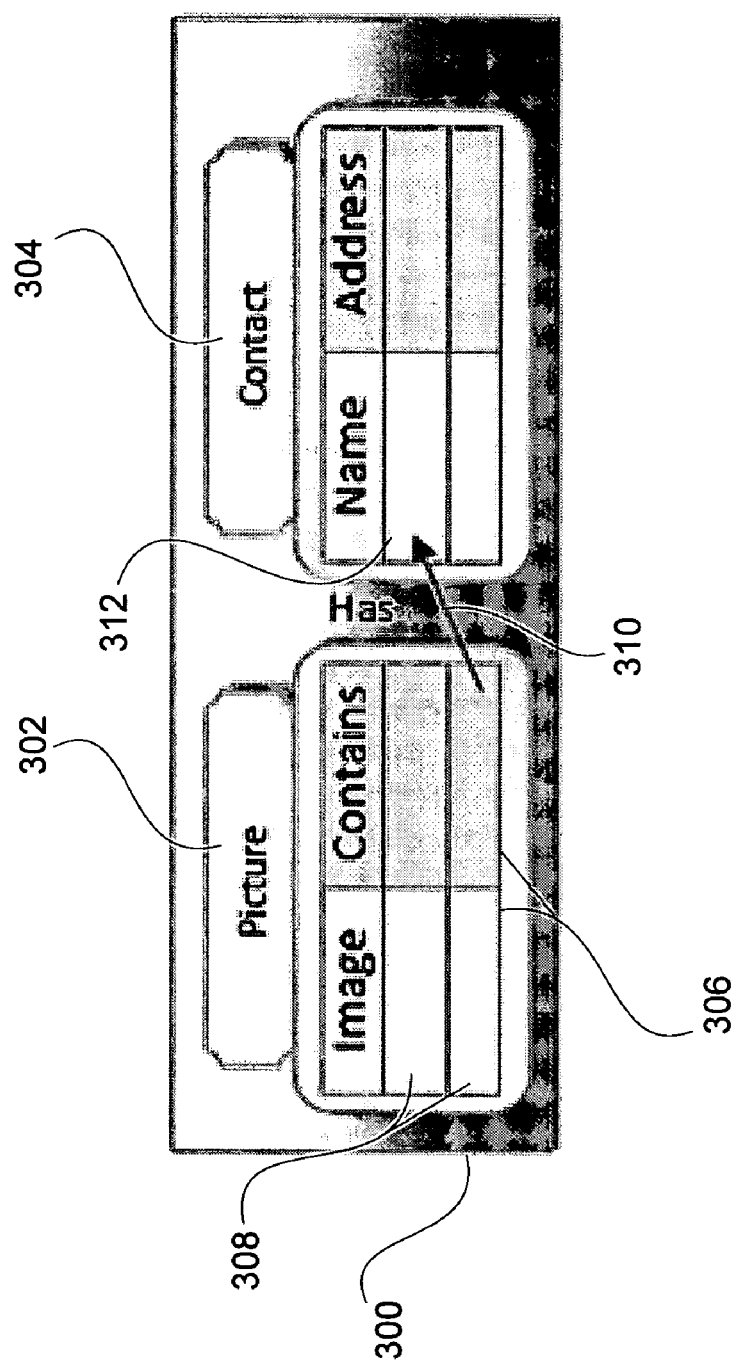
FIG. 3 illustrates a block diagram illustrating an exemplary relation stored as a reference to a particular row in the table of an item.

Referring next to FIG. 3, shown is a block diagram illustrating an exemplary relation stored as a reference to a particular row in the table of an item. WinFS creates a table 300 for all defined Items 302, 304. All the fields defined for the Picture Item 302 form the columns 306 of the table 300; and all instances of the Picture Item 302 are stored as rows 308 in the table 300 for the respective Item 302. A Relation 310 is stored as a reference to the particular row 312 in the table of the Contact Item 304, which holds the instance of the target Item 304 with which the current Item 302 is related. All Items 302, 304 can be exposed as .NET CLR objects, with uniform interface providing access to the data stored in the fields. Thus, any application can retrieve object of any Item type and can use the data in the object, without worrying about the physical structure the data was stored in.

WinFS Relationships

Items can be related to one more other items, giving rise to a one-to-one relationship, or with more than one item, resulting in a one-to-many or many-to-one relationship. The related items, in turn, may be related to other data items as well, resulting in a network of relationships, which is called a many-to-many relationship. Creating a relationship between two items creates another field in the data of the items concerned, which refers to the row in the other item's table where the related object is stored.

Figure 4:
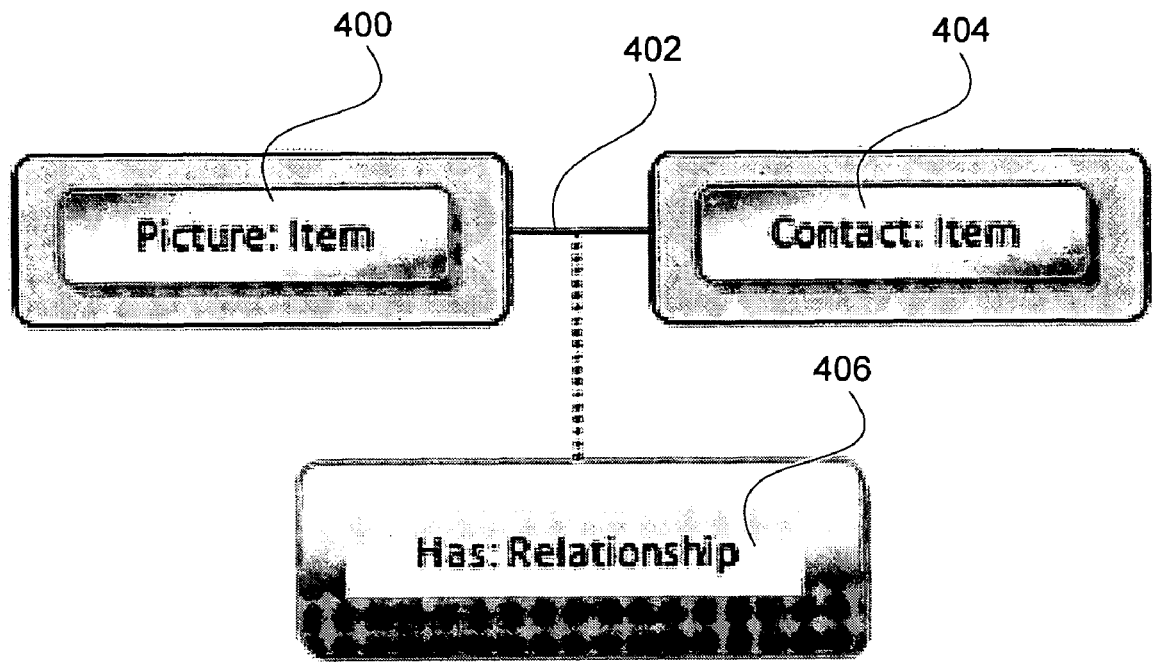
FIG. 4 illustrates is a block diagram illustrating an exemplary relationship between two items.

Referring next to FIG. 4, shown is a block diagram illustrating an exemplary relationship 406 between two items 400, 404. A Relationship 406 represents a mapping 402 between any two items, namely, a Source Item 400 (e.g., a picture item) and a Target Item 404 (e.g., a contact item). From the point of view of the Source item 400, the relationship is an Outgoing Relationship, whereas from the point of view of the target item 404, it is an Incoming Relationship. Relationships are bidirectional, which means that if the Source 400 is related to a Target 404, the Target 404 is also related to the Source 400.

Furthermore, WinFS provides three types of primitive relationships:
Containment, ItemReference, and Condition based association:

- Containment: is an owning relationship. In an owning relationship there is a parent entity and an child entity.
- Item References: ItemReferences are a Fragment type that defines a relationship that contains data between two item instances based on the items keys (ItemId). The ItemReferences are directed—one item is the source of the ItemReference and the other item is the target.
- Condition based association: Condition based association enables declaration of relationships between items that are based on a value of a condition. The condition is an expression that uses values of the properties of the related items types.

WinFS Rules

WinFS includes Rules, which are executed when certain conditions are met. WinFS rules work on data and data relationships. For example, a rule can be created which states that whenever an Item is created which contains field "Name," and if the value of that field is some particular name, a relationship should be created which relates the Item with some other Item. WinFS rules can also access any external application. For example, a rule can be built which launches a Notify application whenever a mail is received from a particular contact. WinFS rules can also be used to add new properties fields to existing data Items.

WinFS rules are also exposed as NET CLR objects. As such any rule can be used for any other purposes. They can be even extended by inheriting them to form a new rule which consists of the condition and action of the parent rule plus something more or new.

WinFS Access Control

Even though all data is shared, everything does not have to be equally accessible. WinFS uses Microsoft® Windows' authentication system to provide two data protection mechanisms. First, there is share-level security that controls access to the WinFS share. Second, there is item level security that supports Microsoft® Windows NT compatible security descriptors. The process accessing the item must have enough privileges to access it. Also in Microsoft® Windows Vista, there is the concept of "integrity level" for an application. A higher integrity data cannot be accessed by a lower integrity process.

WinFS Data Retrieval

The primary mode of data retrieval from a WinFS store is searching for the required data and enumerating through the set of Items that has been returned. WinFS also supports retrieval of the entire collection of Items that is stored in the WinFS store, or returning a subset of it which matches the criteria that has been queried for.

WinFS makes all data available as CLR objects. So the data retrieved, which is encapsulated as an object, has intrinsic awareness of itself. By using the abstraction provided by use of objects, it presents a uniform interface to hide its physical layout and still allow applications to retrieve the data in an application-independent format, or to get information about the data such as its author, type, and its relations.

For each Item that has been returned, WinFS can also return a set of Relations which specify the Relations the Item is involved in. WinFS can return all the relations of the Item, or can return Relations that conform to a queried criterion. For each pair or Item and Relation, WinFS can retrieve the Item which forms the other end of the Relation. Thus, by traversing the Relations of an Item, all the Items that are related with the Item can be retrieved.

WinFS Search

WinFS application programming interface (API) provides a class called the ItemContext class, which is used to query for and update WinFS Items. The criterion for the query is expressed using an ESQL (Entity SQL) query string, which is derived from Transact SQL (TSQL), and extends it with additional support for rich types, collections and objects. As an example, the following query will return a collection of messages located in a folder given the folder's ItemId (@itemId) and that has a Title that starts with a specified string:

```
select msg from OfType(Items, System.Storage.Message) as msg
where msg.Title like "Travel to %" and ContainerItemId=@itemId
```

The above statement is very similar to a transact SQL statement with the addition of a new operator of Type. Joins, order by group by, aggregate functions, nested queries can also be used in ESQL. ESQL, however, does not have to provide 100% compatibility with TSQL. An ESQL query can specify a single search condition or a compound condition. ESQL queries can also be used with relations to find related data.

WinFS Data Sharing

WinFS allows easy sharing of data between applications. Additionally, there may be a provision to share data among multiple WinFS stores as well (which might reside on different computers) by copying to and from them. A WinFS item can also be copied to a non WinFS file system. But, unless that data item is put back into WinFS store, it won't support the advanced services provided by WinFS.

WinFS APIs also provide some support for sharing with non-WinFS applications. WinFS exposes a shell object to access WinFS stores. This object, which maps the WinFS items to a virtual folder hierarchy, can be accessed by any application. Non-WinFS file formats can be stored in WinFS stores as well, using the File Item, provided by WinFS. Importers can be written which convert specific file formats to WinFS Item types.

WinFS data can also be manually shared using network shares, by sharing the legacy shell object. In addition, WinFS provides synchronization services to automatically synchronize Items in two or more WinFS stores, subject to some predefined condition, such as share only photos or share photos which have an associated contact. The stores may be in the same computer or on different computers. Synchronization is done in a peer-to-peer mode, eliminating the need to any central authority to manage the synchronization. Whenever a synchronization is initiated, which can be either manual or automatic or scheduled, WinFS can enumerate the changes (i.e. it finds out which Items are new or changed, and therefore in need of synchronization, and then it can update them accordingly). If two or more changes are conflicting, WinFS can either resort to automatic resolution of the conflict (based on predefined rules) or it can defer them for manual resolution.

Exemplary Architecture of a WinFS System

Figure 5:
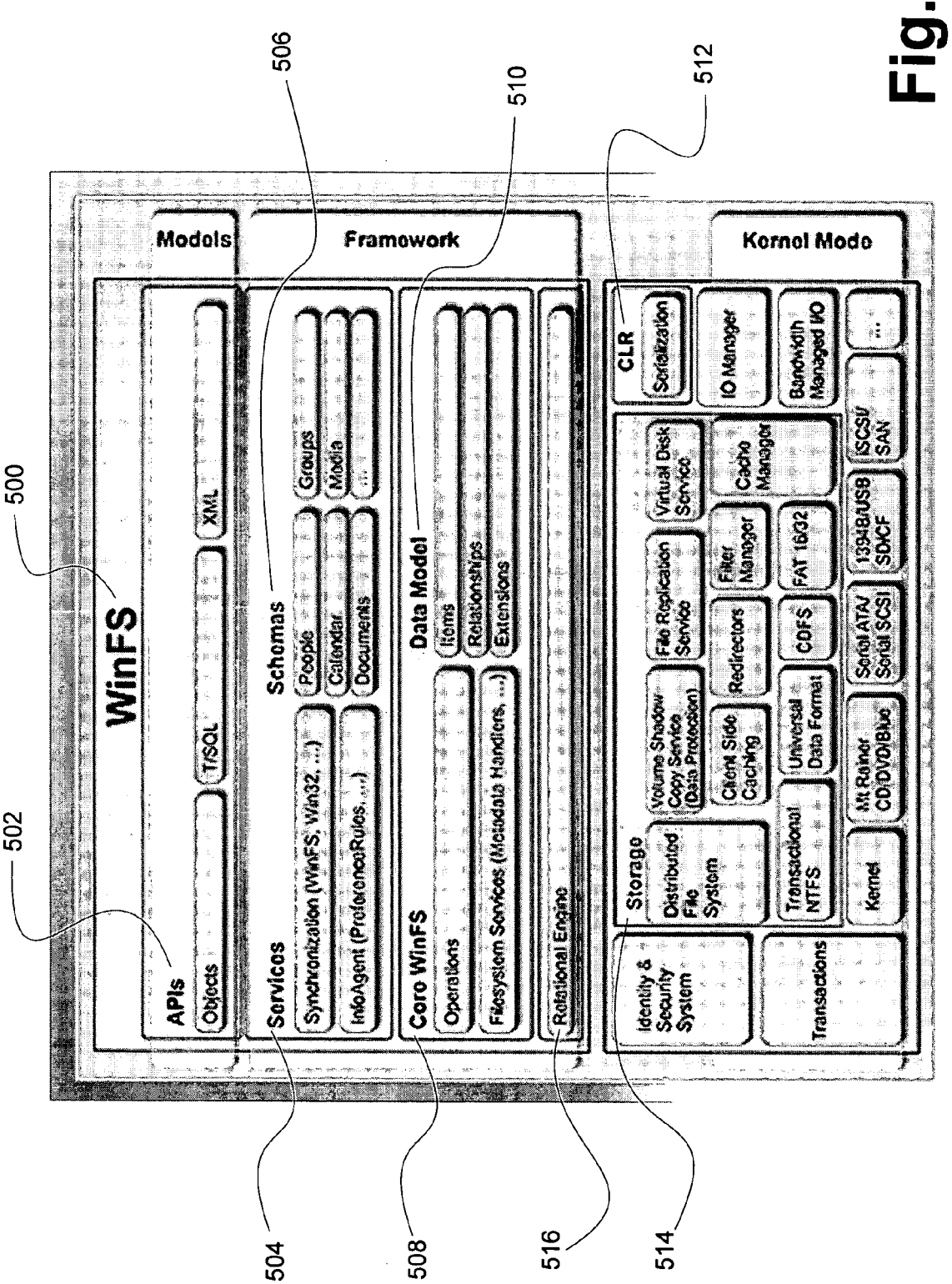
FIG. 5 illustrates one exemplary architecture of a WinFS system.

FIG. 5 illustrates one exemplary architecture of a WinFS system 500. A WinFS system 500 can have various APIs 502. These APIs 502 can handle commands and data for objects, T/SQL statements, or XML input. Furthermore, the system 500 can provide various services 504, including synchronization, information on rules, and the like. Also, schemas 506 for various Item types can be contained in the illustrated framework—for example, people, calendar, documents, groups, media, and so on. The core WinFS module 508 can provide for various operations, file system services (e.g. metadata handlers), and so on. Moreover, a data model 510, per the discussion above, can be provided for items, relationships, extensions, and so on. Lastly, a relational engine 516 for handling queries and enforcing data integrity with respect to semantics, transactions, and constraints.

In the kernel mode, if such a WinFS 500 system is coupled to an operating system, it may interact with a CLR module 512 and a storage module 514 that may contain a host of other modules performing a variety of tasks (as those of skill in the art will readily appreciate): distributed file system; transactional NTFS; identity and security system; transactions; volume shadow copy service (data protection) module; client side caching; redirectors, and so on, as shown in FIG. 5. However, the WinFS system 500 depicted in FIG. 5 can work with any operating system—not necessarily the kernel illustrated in FIG. 5. Additionally, the WinFS system 500 can also act as a standalone module, working by itself or capable of interfacing with other modules and applications.

Aspects of the Relational Lockdown for an Item Store

Figure 6:
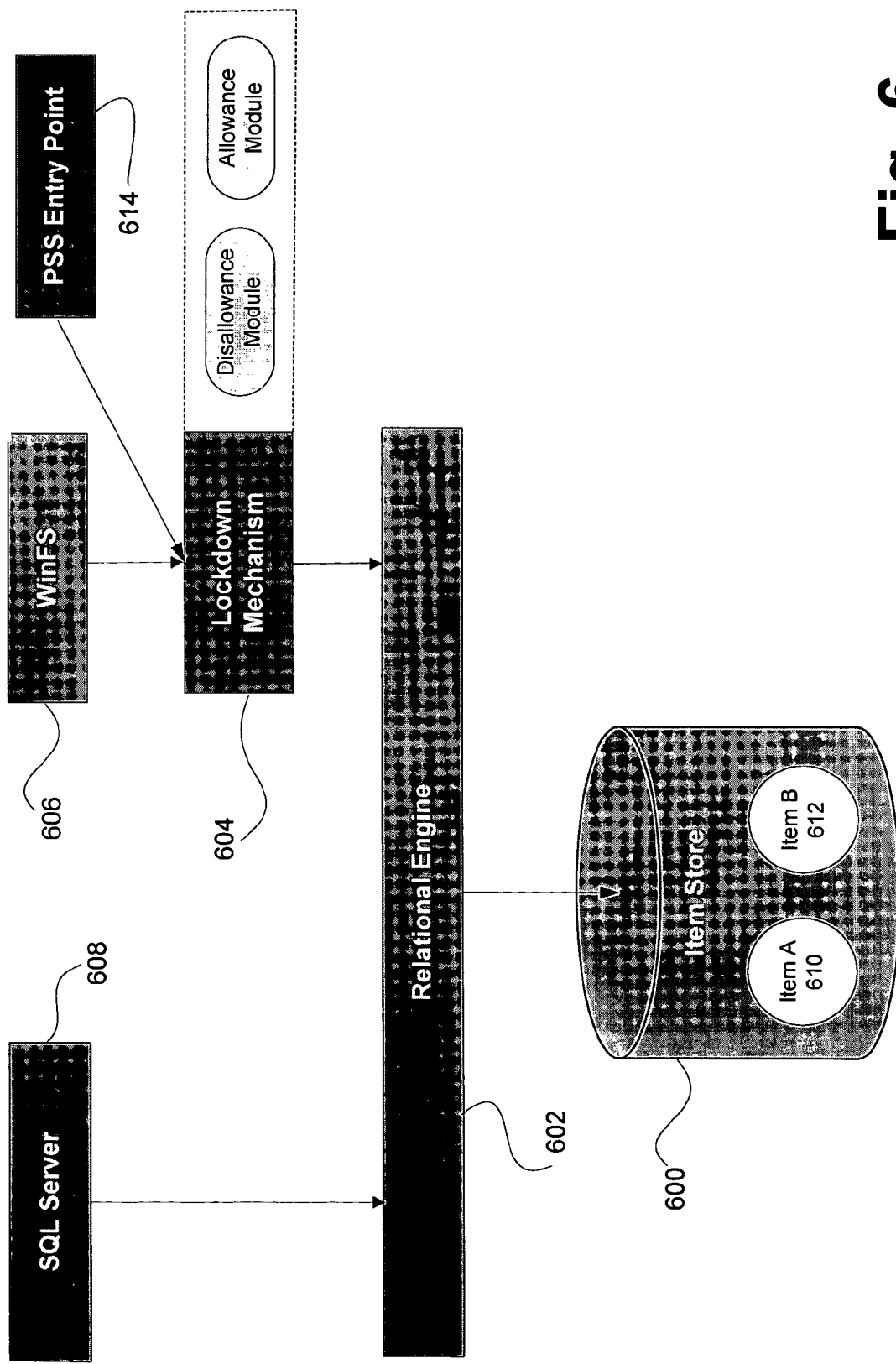
FIG. 6 illustrates that a relational lockdown mechanism monitors access by programs, such as WinFS, into an item store.

FIG. 6 illustrates that a relational lockdown mechanism monitors access by some programs that attempt to access an item store. In FIG. 6, a database program, such as SQL Server (albeit other database programs could just as easily be used) can access the item store 600 via a relational engine 602 to obtain data from a store 600 (WinFS items can be stored on SQL objects). The store 600 can contain various items, such as Item A 610 and Item B 612, which may be data of a certain type. Moreover, a WinFs program 606 may also access the item store 600 using the same relational engine 602. The relational engine 602 (a SQL engine serving as only one example of a myriad of such engines) can be an implementation of the relational Database Management System (RDBMS). Furthermore, in another aspect of the relational lockdown mechanism 604, a product support services (PSS) entry point 614 may be provided such that signed procedures meant to, say, debug any features in the item store 600, can be provided to the item store 600.

The scope of access may differ for such programs 606, 608 for security, business, intellectual property protection, and other reasons. A lockdown mechanism 604 can monitor the type of access in question, whether the access comprises functions such as Select, Insert, Update, Delete, Grant, Deny, Revoke, Creation operations such as CreateTable, and so on. The lockdown mechanism 604 not only might prevent certain access by the WinFS program 606, but it may posit the types of access the WinFs program (or other programs) can engage in.

The lockdown mechanism can employ a two step process (i.e. it may comprise of two stages): (1) disallowing all access by WinFS 606 users, and then (2) based on this blanket disallowance, make some exceptions to allow a limited set of privileges by WinFS 606 users.

Regarding the first disallowance stage, a typical security model, such as SQL, gives carte blanche to the owner of an object. All the WinFS objects may be owned by special user, namely, a data base owner (DBO), and members of a system administration (sysadm) role can be mapped to DBO in all databases. Therefore, members of the sysadm role have full access to the SQL securable objects (on which WinFS item may be stored). Built-in administrators (BAs), by default, members of the sysadm role and hence BAs have full permissions on all WinFS objects (Tables, Procedures etc.). To deny relational access to administrators on WinFS, the lockdown mechanism removes BAs and other such administrators from SQL sysadm role (i.e. a group). The removal of BA from sysadm and the lack of public grants equally guarantee denial of relational support to WinFS users including administrators.

Regarding the second allowance stage, the lockdown mechanism 604 may use security certificates to allow limited access by WinFS 606 users. A security certificate is typically issued by a trusted organization (or entity) called a certification authority (CA) after the CA has verified that the entity is who it says it is. Certificates can contain different types of data. For example, an X.509 certificate includes the format of the certificate, the serial number of the certificate, the algorithm used to sign the certificate, the name of the CA that issued the certificate, the name and public key of the entity requesting the certificate, and the CA's signature.

Such certificate based cryptographic signing gives two fundamental assurances—the identity of the signer and integrity of the content. For example, signing a procedure may grant it "definer's rights" in addition to "invoker's rights." At a given time, the rights for, say, a SQL context, are the rights of the SQL principal combined with the rights of the code. The following is the meta-level instructions to create a certificate and sign a sample procedure. The steps below grant execute to a procedure enabling the caller to insert data into a table (e.g. customer) that the user does not have direct INSERT permission on:

```
CREATE CERTIFICATE DemoCert ENCRYPTION BY PASSWORD =
'secureIt' WITH subject = 'DemoCert';
ADD SIGNATURE TO DemoProcedure BY CERTIFICATE DemoCert
WITH PASSWORD = 'secureIt'
CREATE USER DemoCertUser FOR CERTIFICATE DemoCert
GRANT INSERT ON customer TO DemoCertUser
GRANT EXECUTE ON DemoProcedure TO public
DENY INSERT ON customer TO public
```

When a signable object is signed by a certificate, the user (e.g. DemoCertUser) becomes a 'secondary principal' in the security token while executing that module. All the permissions associated with the DemoCertUser are automatically applicable in the execution context of the procedure. This provides an efficient mechanism to selectively grant special permissions while executing certain modules that are otherwise unavailable to the calling user.

Furthermore, counter signatures are relevant when a signed module invokes another module. There are instances where it is useful to have the secondary context preserved while executing the callee and cases where the secondary context should be dropped from the security context while executing the callee.

Counter signatures are applied to the callee. When the caller who is signed with a certificate invokes a callee that is countersigned with the same certificate, rights derived from the certificate are preserved while executing the callee. If the callee is not countersigned with the same certificate, rights derived from the certificate are dropped while executing the callee. If one invokes the countersigned module directly, it does not inherit any rights by virtue of the associated countersign certificate. So countersignatures extend user permissions for a module only if it is called by another module signed by the same certificate. For both signing and countersigning, an offline mechanism can be used, which applies precomputed signatures obviating the need for the presence of a public key this system.

Figure 7:
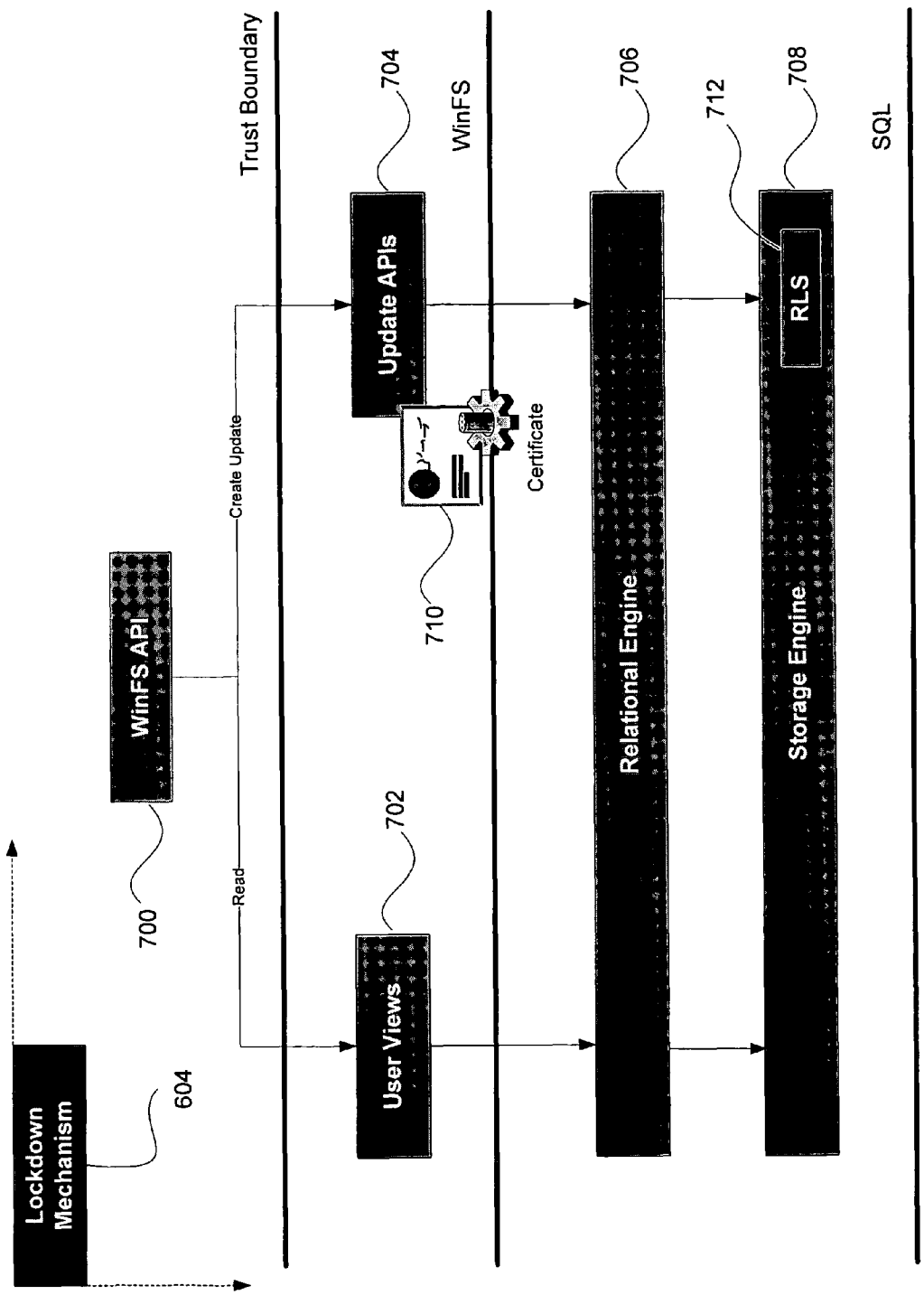
FIG. 7 illustrates the lockdown mechanism making use of certificates to monitor access by a WinFS API.

FIG. 7 illustrates the lockdown mechanism making use of certificates to monitor access by a WinFS API. A WinFs API provides a means for accessing data in an item store 600 (see FIG. 6). For example, a read operation could make use of user views 702. These user views 702 could access the relational engine 706 (and eventually the item store 600 via the storage engine 708). However, the WinFS API could also be asked to create an update, in which case the update would pass through an update API 704 and a certificate 710 would be examined to ensure that the create update request can take place (the creation of updates may be typically disallowed for WinFS users, whereas the reading of data through user views 702 may not, and hence the lack of need for certificates in such a scenario).

If the certificate 710 is appropriate, per the discussion above, access to the storage engine is allowed. Either direct permissions grants to a certificate (signing) or ownership chaining (countersigning) can be used for all DML and DDL operations required by WinFS implementation in the store (DDL may be required for components like schema installations, etc). Store side components (functions and procedures in base, filesystem, etc.) that require additional SELECT access to a Row Level Security (RLS) 712 protected rows in the tables can be signed with the base security certificate that is granted the "exempt RLS" privilege. The RLS 712 infrastructure honors this privilege and lets the caller bypass RLS 712 giving seamless query access to relevant tables. Direct grants, ownership chaining, and "RLS exempt" 712 together facilitate comprehensive relational support for WinFS components (for e.g. CreateItem).

In another aspect of the lockdown mechanism, a group of users may have an associated set of privileges. These users may be associated with a set of respective certificate users which are connected with a set of respective certificates. These certificates are tied to markers (signatures or tokens) that sign any give piece of code. The markers are presented at the relational engine, and access to the store 600 is either allowed or disallowed based on the markers. Or, put another way, access is granted or denied based on the union of all the privileges that users have.

The blanket disallowance of access by any users to WinFS by the lockdown mechanism, and then the granting of a limited set of privileges to these users to access the item store, allows the lockdown mechanism to tightly control any manipulations on items in the store. Thus, any piece of code presented to an API, such as Update APIs 704, is signed with a certificate, and then as a result of this action, the code has a marker which ties back to the set of privileges a user may have. Access or denial thereof is then based on what access privileges such a user has.

Figure 8:
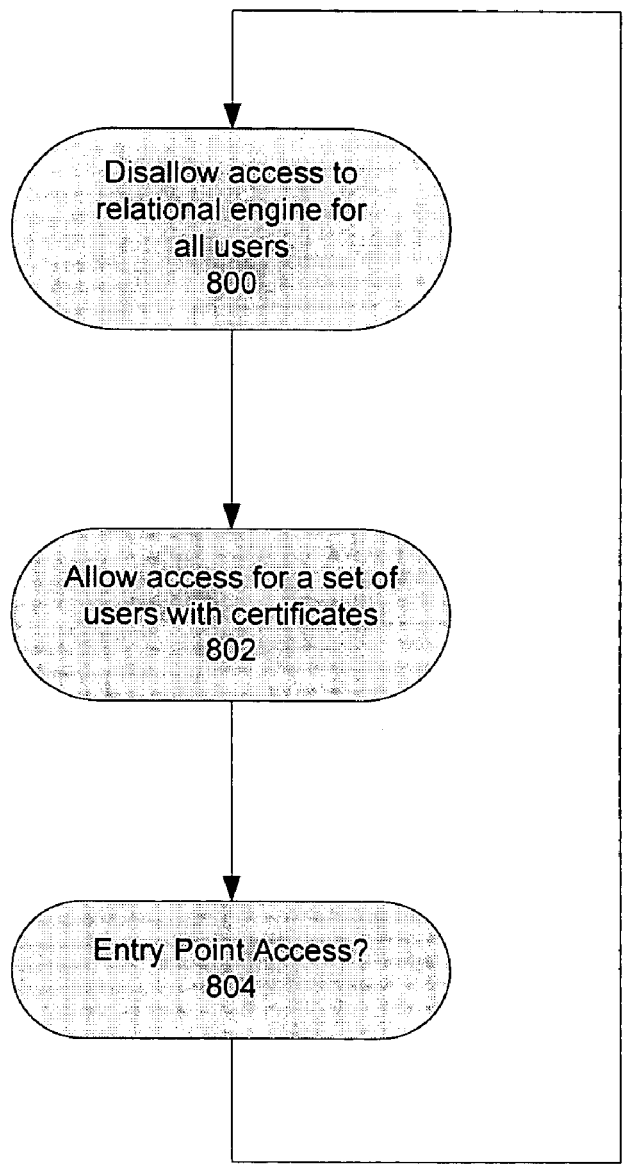
FIG. 8 illustrates in block diagram form a flow chart for aspects discussed in FIGS. 6 and 7.

FIG. 8 summarizes these aspects discussed above. At block 800, access is disallowed for all users of a relational engine. Next, at block 802 access is allowed for users with security certificates. Additionally, at block 804 an entry point access is checked to see if support services may want to use such an entry point. This process can be repeated a number of times—for example, every time a computer turns on and off.

Exemplary Computing and Networking Environment

Figure 9:
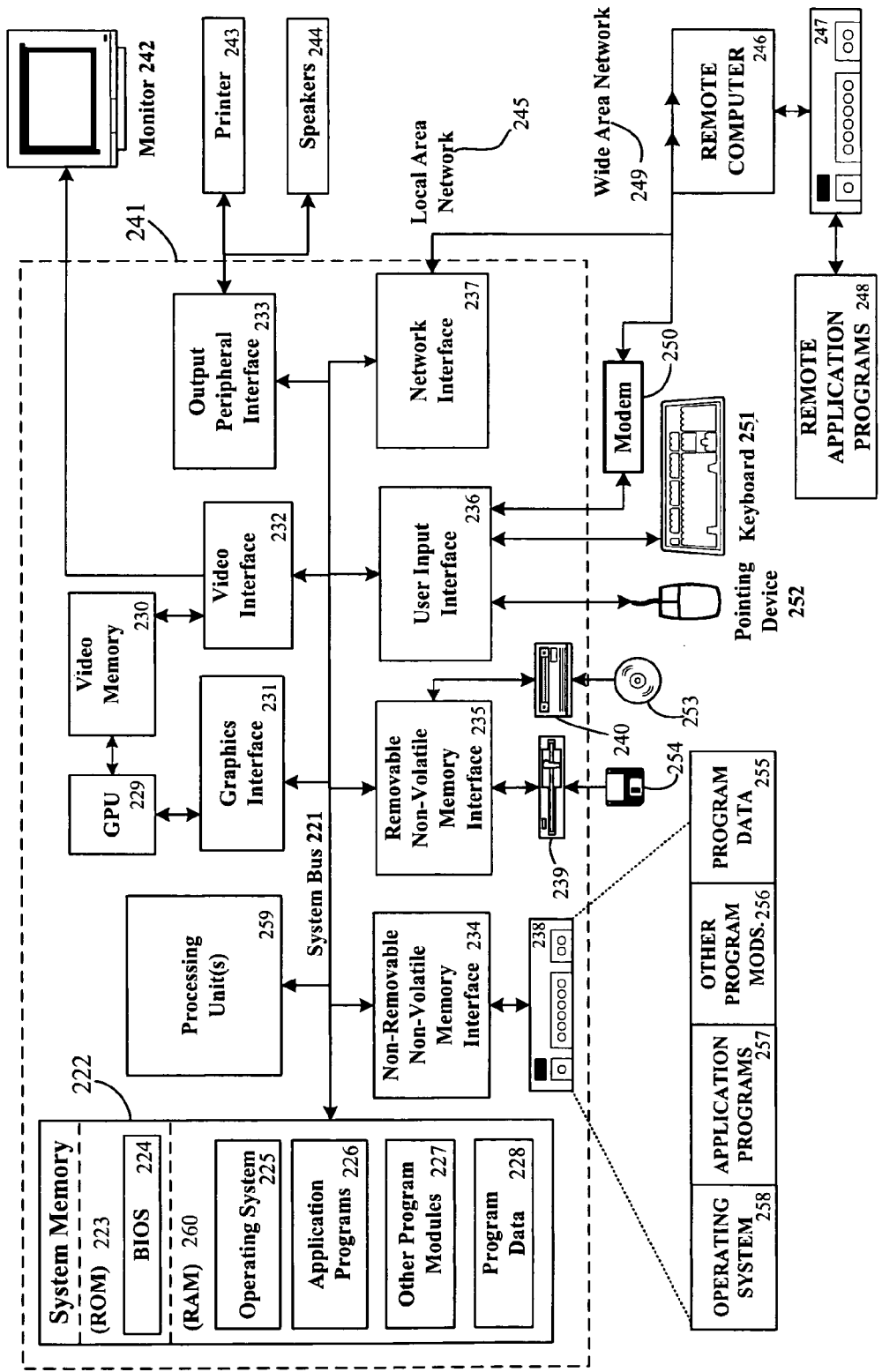
FIG. 9 illustrates a block diagram representing an exemplary computing device suitable for use in conjunction with a WinFS system employing relational lockdown for an item store.

Referring to FIG. 9, shown is a block diagram representing an exemplary computing device suitable for use in conjunction with implementing the systems and methods described above. For example, the computer executable instructions that carry out the processes and methods for a relational lockdown for an item store may reside and/or be executed in such a computing environment as shown in FIG. 9. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. For example a computer game console may also include those items such as those described below for use in conjunction with implementing the processes described above.

Aspects of the presently disclosed subject matter are operational with numerous other general purpose or special purpose computing system environments or configurations. Examples of well known computing systems, environments, and/or configurations that may be suitable for use with the this subject matter include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the presently disclosed subject matter may be implemented in the general context of computer-executable instructions, such as program modules, being executed by a computer. Generally, program modules include routines, programs, objects, components, data structures, etc. that perform particular tasks or implement particular abstract data types. Aspects of the presently disclosed subject matter may also be practiced in distributed computing environments where tasks are performed by remote processing devices that are linked through a communications network. In a distributed computing environment, program modules may be located in both local and remote computer storage media including memory storage devices.

An exemplary system for implementing aspects of the presently disclosed subject matter includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 9 illustrates operating system 225, application programs 226, other program modules 227, and program data 228.

The computer 241 may also include other removable/non-removable, volatile/nonvolatile computer storage media. By way of example only, FIG. 9 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 9, provide storage of computer readable instructions, data structures, program modules and other data for the computer 241. In FIG. 9, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 9. The logical connections depicted in FIG. 9 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 9 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the said subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

In light of the diverse computing environments that may be built according to the general framework provided in FIG. 9, the systems and methods provided herein cannot be construed as limited in any way to a particular computing architecture. Instead, the presently disclosed subject matter should not be limited to any single embodiment, but rather should be construed in breadth and scope in accordance with the appended claims.

Figure 10:
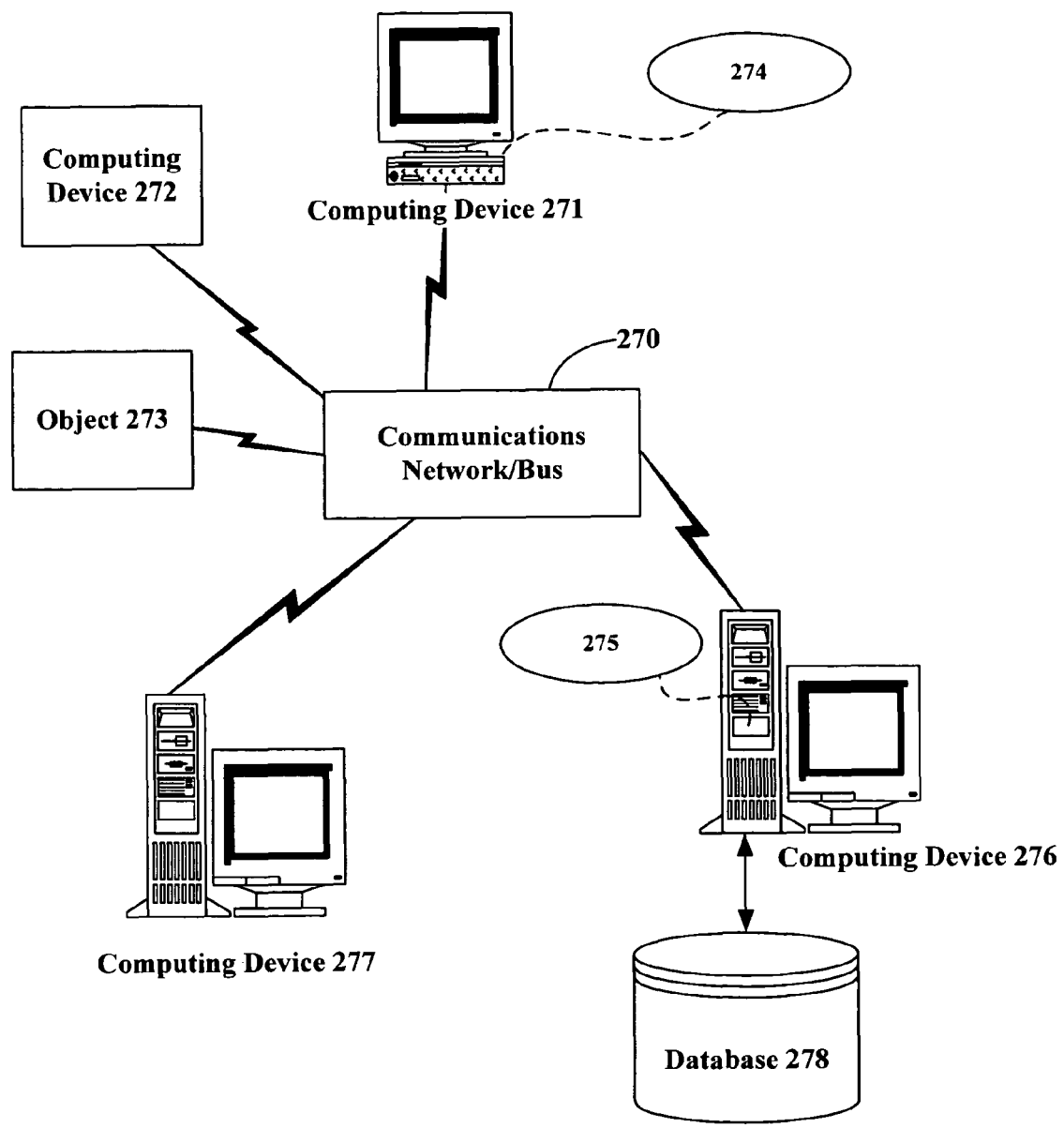
FIG. 10 illustrates an exemplary networked computing environment in which many computerized processes may be implemented to perform the aforementioned relational lockdown in various devices across a network.

Referring next to FIG. 10, shown is an exemplary networked computing environment in which many computerized processes may be implemented to perform the processes described above. For example, parallel computing may be part of such a networked environment with various clients on the network of FIG. 10 using and/or implementing the defining and extracting of a flat list of search properties from a rich structured type. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 10 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 10, and may itself represent multiple interconnected networks. In accordance with an aspect of the presently disclosed subject matter, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 10, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 10 and the further diversification that can occur in computing in a network environment such as that of FIG. 10, the systems and methods provided herein cannot be construed as limited in any way to a particular computing architecture or operating system. Instead, the presently disclosed subject matter should not be limited to any single embodiment, but rather should be construed in breadth and scope in accordance with the appended claims.

Lastly, while the present disclosure has been described in connection with the preferred aspects, as illustrated in the various figures, it is understood that other similar aspects may be used or modifications and additions may be made to the described aspects for performing the same function of the present disclosure without deviating therefrom. For example, in various aspects of the disclosure, mechanisms for a relational lockdown for an item store as disclosed. However, other equivalent mechanisms to these described aspects are also contemplated by the teachings herein. Therefore, the present disclosure should not be limited to any single aspect, but rather construed in breadth and scope in accordance with the appended claims.

What is claimed:

1. A system for relational lockdown of an item store, the system comprising:
a processing unit;
a relational object item store comprising data items persisted as relational objects;
a relational engine;
a filing system configured to:
manipulate, utilizing said relational engine, data items written in application specific format in the item store; and
manage, store and retrieve the data items in accordance with a respective type of each data item; and
a memory system storing:
a first program module comprising instructions that are executable by the processing unit for initiating a lockdown of said item store by disabling all access to said item store by all users associated with said filing system, each user having an assigned set of privileges indicative of operations that the user is allowed to perform on the item store; and
a second program module comprising instructions that are executable by the processing unit for:
determining a sequence of caller and callee modules invoking executable code;
determining, by combining privileges associated with the sequence of caller and callee modules, a privilege level associated with the executable code, the privilege level indicative of operations that the executable code can perform on the item store;
determining a set of privileges assigned to a user associated with the executable code;
determining a combined set of privileges, based on the privilege level associated with the executable code and the set of privileges assigned to a user associated with the executable code; and
after the first program module has disabled all access to said item store, allowing limited access to said item store, based on said combined set of privileges.

2. The system according to claim 1, wherein the first program module comprises instructions that are executable by the processing unit to disable access to said item store by removing all users from a role that specifies ownership of items in the item store.

3. The system according to claim 1, wherein the second program module comprises instructions that are executable by the processing unit to allow limited access to said relational engine by using security certificates.

4. The system according to claim 3, wherein the security certificates are associated with corresponding certificate users and wherein said certificate users have said set of privileges.

5. The system according to claim 3, wherein said security certificates sign a command resulting in the command being marked with a marker, wherein the marker either allows or disallows access to the relational engine depending on said set of privileges.

6. The system according to claim 1, wherein the memory system further stores instructions that are executable by the processing unit to implement an entry point for access to said relational engine, wherein said entry point allows separate access from the limited access provided by said second program module.

7. The system according to claim 1, wherein said filing system is WinFS and said relational engine is associated with SQL Server.

8. The system according to claim 1, wherein no user of an operating system in which the filing system executes can own any object on which any item in the item store is based.

9. A method for relational lockdown of an item store comprising data items persisted as relational objects and a relational engine, the method comprising:
initiating a lockdown of a relational object item store by disabling all access to said item store by all identities associated with a filing system utilizing said relational engine to manipulate data items written in application specific format in the item store and managing, storing and retrieving the data items in accordance with a respective type of each data item, each identity having an assigned set of privileges to access the item store;
determining a sequence of caller and callee modules invoking executable code;
determining, by combining privileges associated with the sequence of caller and callee modules, a privilege level associated with the executable code; and
after said disabling all access, allowing limited access to said item store by one or more identities associated with the executable code, based on the set of privileges assigned to the one or more identities and the privilege level associated with the executable code.

10. The method according to claim 9, wherein said disabling access to said item store removes all identities from a role that specifies ownership of items in the item store.

11. The method according to claim 9, wherein said allowing comprises providing access to said relational engine by using security certificates.

12. The method according to claim 11, further comprising associating said security certificates with corresponding certificate identities, said certificate identities having said set of privileges.

13. The method according to claim 9, further comprising using said security certificates to sign a command resulting in the command being marked with a marker, wherein the marker either allows or disallows access to the relational engine depending on said set of privileges.

14. The method according to claim 9, further comprising providing an application programming interface (API) for signing a command for said relational engine.

15. A computer readable storage medium not consisting of communication media, the computer readable storage medium comprising computer executable instructions executable by a computer to perform acts for relational lockdown of an item store, the acts comprising:
initiating a lockdown of a relational object item store by disabling all access to a relational engine by all identities associated with a filing system utilizing said relational engine to manipulate data items written in application specific format in the item store and managing, storing and retrieving the data items in accordance with a respective type of each data item, each identity having an assigned set of privileges to access the item store;
determining a sequence of caller and callee modules invoking executable code;
determining, by combining privileges associated with the sequence of caller and callee modules, a privilege level associated with the executable code; and allowing limited access to said relational engine by one or more identities, after said disabling all access, based on the set of privileges assigned to the one or more identities and the combined privileges associated with the sequence of caller and callee modules invoking the executable code.

16. The computer readable storage medium according to claim 15, wherein access to said item store is disabled by removing all identities from a role that specifies ownership of items in the item store.

17. The computer readable medium according to claim 15, wherein access to said relational engine is allowed by using security certificates.

18. The computer readable medium according to claim 17, wherein access is allowed by associating said security certificates with corresponding certificate identities, said certificate identities having said set of privileges.

19. The computer readable storage medium according to claim 18, further comprising computer executable instructions tangibly embodied on the computer readable storage medium, which are executable by a computer for providing an application programming interface (API) for signing code with a marker by using said security certificates.

20. The computer readable storage medium according to claim 15, further comprising computer executable instructions tangibly embodied on the computer readable storage medium, which are executable by a computer for providing an entry point to the relational engine separate from providing access to said relational engine.

21. The method according to claim 9, wherein the set of privileges assigned to the one or more identities are indicative of operations that the one or more identities are allowed to perform on the item store.

22. The method according to claim 21, wherein the privilege level associated with the executable code is indicative of operations that the executable code is allowed to perform on the item store.

23. The method according to claim 22, further comprising determining a combined set of privileges based on the privilege level associated with the executable code and the set of privileges assigned to the one or more identities associated with the executable code, wherein said allowing limited access is further based on the combined set of privileges.

24. The method according to claim 9, wherein said limit access comprises a subset of data and schema operations on said item store.

25. The method according to claim 9, wherein the privilege level is indicative of operations that the executable code can perform on the item store.

26. The method according to claim 25, further comprising determining a set of privileges assigned to one or more identities associated with the executable code.

27. The computer readable medium according to claim 15, further comprising determining a sequence of caller and callee modules invoking executable code.

28. The computer readable medium according to claim 27, further comprising determining, by combining privileges associated with the sequence of caller and callee modules, a privilege level associated with the executable code, the privilege level indicative of operations that the executable code can perform on the item store.

29. The computer readable medium according to claim 28, further comprising determining a set of privileges assigned to one or more identities associated with the executable code.

* * * * *